United States Patent [19]

Scheurer

[11] Patent Number: 5,170,720
[45] Date of Patent: Dec. 15, 1992

[54] ADJUSTABLE CAR TABLE

[76] Inventor: Robert S. Scheurer, 1627 Midwestern Pkwy., Wichita Falls, Tex. 76302

[21] Appl. No.: 534,465

[22] Filed: Jun. 7, 1990

[51] Int. Cl.⁵ .......................................... A47B 37/00
[52] U.S. Cl. ...................................... 108/44; 108/157;
        108/146; 108/132; 248/188.5; 297/135
[58] Field of Search .................. 108/25, 44, 45, 115,
    108/144, 146, 148, 151, 152, 157, 158, 159, 132;
    297/135, 253; 248/161, 165, 188, 188.5, 231.3,
                    307, 412, 414; 224/275, 314

[56]                References Cited
            U.S. PATENT DOCUMENTS

| 795,957 | 8/1905 | Cartland | 108/157 X |
| 970,425 | 9/1910 | Curran | 248/188.5 X |
| 1,558,612 | 10/1925 | Hohorst | 108/158 |
| 1,705,867 | 3/1929 | Korkames | 108/44 |
| 2,791,476 | 5/1957 | Atwell | 108/45 |
| 2,934,391 | 4/1960 | Bohnett | 108/44 X |
| 2,986,438 | 5/1961 | Smathers et al. | 108/44 |
| 3,063,064 | 11/1962 | Mace | 108/44 X |
| 3,428,357 | 2/1969 | Lueck | 224/275 |
| 4,010,696 | 3/1977 | Priesman | 108/44 X |
| 4,043,277 | 8/1977 | Wallace | 248/188.5 X |
| 4,174,669 | 11/1979 | Lalonde | 108/44 |
| 4,462,636 | 7/1984 | Markson | 108/132 X |
| 4,524,701 | 6/1985 | Chappell | 224/275 |
| 4,909,159 | 3/1990 | Gonsoulin | 108/44 |

FOREIGN PATENT DOCUMENTS 532596 11/1956 Canada ................................. 108/44
  9970 of 1886 United Kingdom ................ 248/412

Primary Examiner—Kenneth J. Dorner
Assistant Examiner—Milton Nelson, Jr.
Attorney, Agent, or Firm—Dennis T. Griggs

[57] ABSTRACT

A food service tray for use in an automobile is supported on one end by an automobile seat, and is supported on its opposite end by an adjustable height leg stand. The adjustable leg stand includes a stanchion which is mounted for extension and retraction within a receiver pocket. The elevation of the food service tray and the extended position of the stanchion are fixed by a releasable latch. In automobiles having separately movable seats, the food service tray is stabilized by a slidable anchor arm which is inserted between the movable seats.

4 Claims, 5 Drawing Sheets

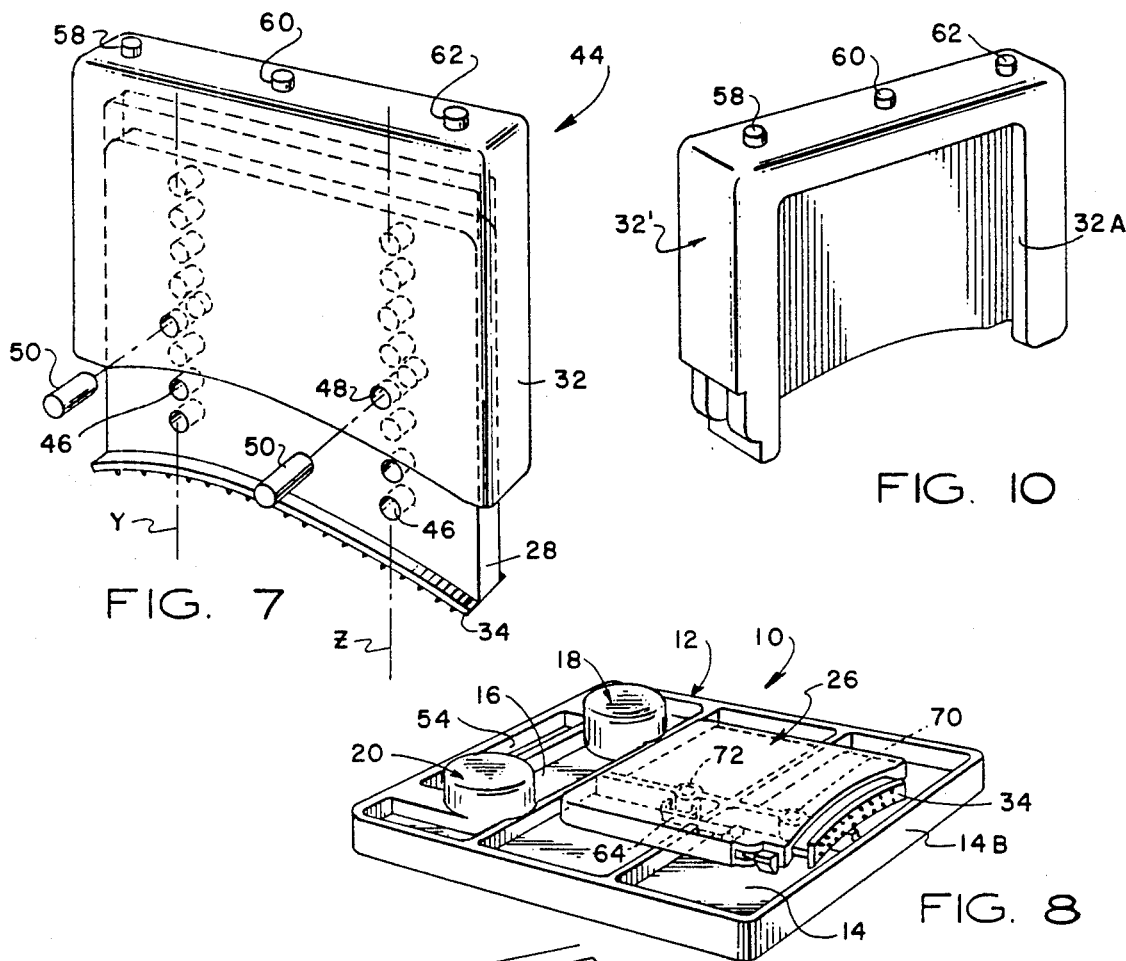
FIG. 7
FIG. 10
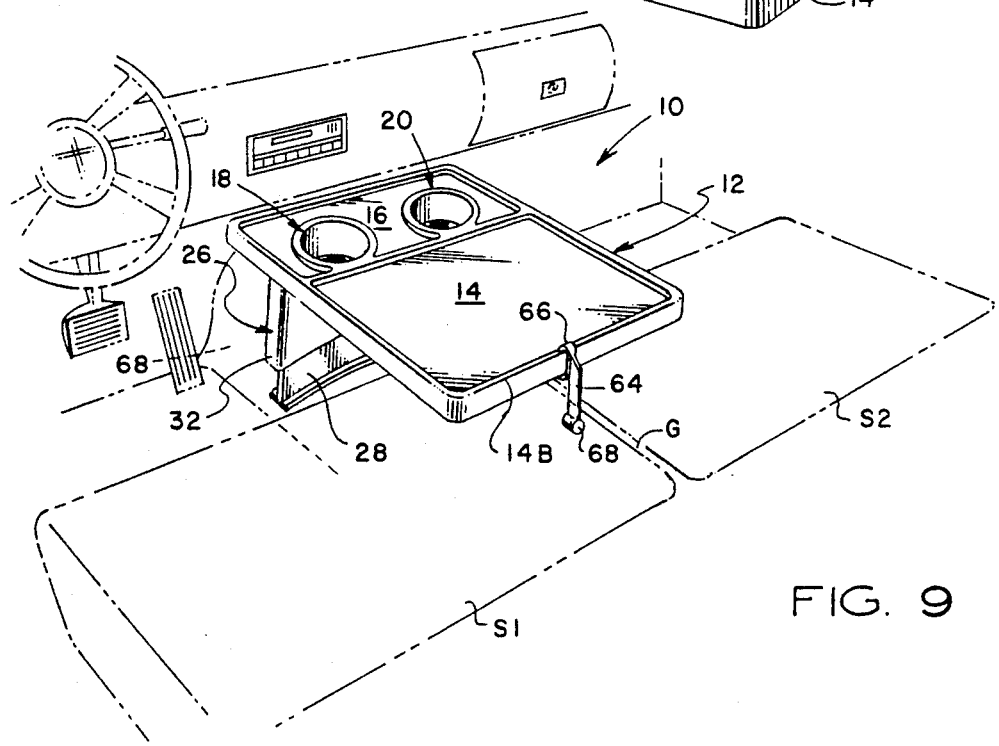
FIG. 8
FIG. 9

ADJUSTABLE CAR TABLE

FIELD OF THE INVENTION

This invention relates generally to utility console accessories for automobiles, and in particular to a seat-mounted food service tray.

BACKGROUND OF THE INVENTION

There are many occasions when it is desirable or expedient to eat a meal in an automobile or truck, for example while traveling, at a drive-in movie, at a sports event and the like where usual dining accommodations are not available. Many take-out food and beverage items are available at fast-food restaurants and are intended for on-the-road consumption. A popular practice is to take along a cup of coffee from home while driving to work.

Most automobiles and trucks are not equipped for on-the-road dining. Consequently, take-out food items and beverages are not well organized and usually are enclosed within a paper bag o box container. Such paper containers are intended for enclosing and carrying food and beverage items, and are not suitable for use as a serving tray. Consequently, it is difficult for the operator to handle such food and beverage items while maintaining safe control of the vehicle. It is somewhat easier for passenger to handle food and beverage items since both hands will be free. Nevertheless, the handling of food and beverage items by either a passenger or operator is awkward because of the lack of a stable food service tray on which food items and beverage containers can be placed and retained without spilling or shifting under normal driving conditions, and without requiring operator or passenger attention.

DESCRIPTION OF THE PRIOR ART

Portable utility consoles have been proposed for use in automobiles and trucks. Such console units are typically designed for placement either on the floor or seat of a vehicle and come in a variety of different sizes and shapes, depending upon the nature and size of the items to be stored. Some utility consoles are mounted on the transmission hump and provide separate receptacles for a variety of items, for example beverage containers, facial tissues and garage door transmitters. Other seat-mounted utility consoles are adapted for use by business travelers to accommodate articles such as briefcases, files, maps, coins and audio cassettes. Small utility consoles are adapted to ride o the floor mat or on the seat, while larger console units of the type providing a desk surface usually include an attached tie-down strap to avoid shifting and/or spillage of the contents.

Such utility consoles are heavy, bulky and are difficult to store when not in use. Conventional consoles which are secured by a tie-down strap are difficult to install and remove. Moreover, some utility consoles are customized for use in combination with a specific automobile type, and have contoured mounting surfaces which cannot be used with the seats of other automobiles. Some utility console units are adapted for mounting only on the floor or transmission hump, while others are adapted for mounting only on a bench seat and cannot be used in combination with independently movable bucket seats.

OBJECTS OF THE INVENTION

The principal object of the present invention is to provide an improved portable utility console for use as a food service tray in an automobile.

A general object of the present invention is to provide a lightweight, durable food service tray which can be quickly set up for automobile use and easily disassembled for compact storage when not in use.

Another object of the present invention is to provide a portable utility food service tray of the character described, which can be used equally well on either the front seat or the back seat of an automobile.

A related object of the present invention is to provide a portable utility food service tray of the character described, which ca be used in combination with independently movable bucket seats as well as bench seats.

Another object of the present invention is to provide an improved food service tray for automobile use, with the service height of the tray being adjustable to accommodate variations in seat height relative to the floor or transmission hump of an automobile.

Yet another object of the present invention is to provide an improved utility tray which can be stabilized against a car seat without the use of tie-down straps.

Still another object of the present invention is to provide an improved food service tray of the character described, which is stabilized against shifting movement under normal driving conditions, and which does not require operator or passenger attention.

A specific object of the present invention is to provide a convenient, stable food service tray for use in an automobile for accommodating food and beverage items which the operator and/or passengers may take from home or pick up from a fast-food convenience store or drive-through restaurant for on-the-road consumption.

SUMMARY OF THE INVENTION

The portable utility console of the present invention includes a food service tray which is supported on one end by an automobile seat, and is supported on its opposite end by an adjustable height leg stand. The adjustable leg stand includes a stanchion which is slidably received within a receiver pocket for extension and retraction relative to the food service tray. The elevation of the food service tray and the extended position of the stanchion are fixed by a releasable latch.

According to an optional feature, the aft portion of the food service tray is stabilized by a slidable anchor arm which is insertable between relatively movable seats.

According to another optional feature, the leg stand assembly is releasably attached to the food service tray in a supporting position by a press-fit interconnection, and is removable therefrom and attachable to the food service tray in a collapsed, compact storage position.

The above noted features and advantages of the invention as well a other aspects thereof will be appreciated by those skilled in the art upon reading the detailed description which follows with reference to the attached drawings.

BRIEF DESCRIPTION OF THE DRAWINGS

FIG. 7 is a perspective view of an alternative leg stand assembly which is interchangeable with the leg stand assembly shown in FIG 6;

FIG. 8 is a perspective view of the food service tray shown in FIG. 1, with the leg stand assembly removed and collapsed for compact storage;

FIG. 9 is a perspective view of the food service tray of FIG. 1 as installed on the front seat of an automobile;

FIG. 10 is a perspective view of an alternative leg stand receiver housing which is interchangeable with the leg stand receiver housing shown FIG. 6;

DETAILED DESCRIPTION OF THE PREFERRED EMBODIMENTS

Figure 1:
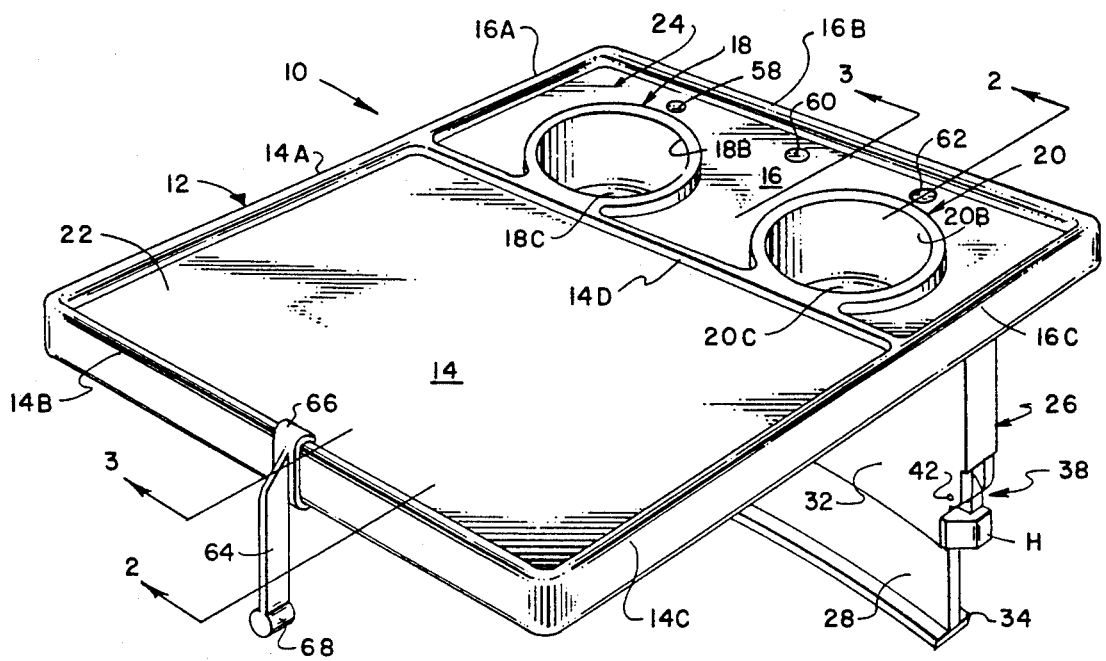
FIG. 1 is a perspective view of a food service tray which is constructed according to a first preferred embodiment of the present invention.

In the description which follows, like parts are marked throughout the specification and drawings with the same reference numerals, respectively. The drawing figures are not necessarily drawn to the scale and the proportions of certain parts have been exaggerated for purposes of clarity.

Referring now to FIGS. 1-9, a portable utility console 10 is adapted for use in an automobile as a food service tray. The portable utility console 10 includes a tray 12 having an aft panel section 14 for accommodating food items such as sandwiches and the like, and having a forward panel section 16 including beverage container receptacles 18, 20 for accommodating beverage containers such as paper cups and aluminum cans. The aft and forward panel sections 14, 16 have side shoulders 14A, 14B, 14C and 14D, and 16A, 16B and 16C, respectively, formed along marginal edge portions of the panels 14, 16, thereby defining aft and forward tray cavities 22, 24, respectively, of shallow depth. The radius lip around the perimeter of the tray prevents food items and other articles from sliding off, and the interior shoulder 14D forms a partition between the aft cavity 22 and the forward cavity 24. The forward cavity 24 also provides a storage area for small articles such as a garage door opener, coins, pencils and the like.

The food service tray 12 is supported by engagement of the aft panel section 14 and its shoulders against the top of an automobile seat. The food service tray is supported on its opposite end by an adjustable height leg stand assembly 26. The leg stand assembly 26 includes a stanchion 28 which is slidably received within a pocket 30 of a receiver housing 32. The stanchion 28 is extendable in telescoping extension and retraction relative to the receiver housing 32. In the preferred embodiment, the stanchion 28 has a concave foot plate 34 which is curved for conforming engagement against the transmission hump of an automobile. Small spikes 36 are attached to the concave foot plate 34 for engaging the floor mat covering of the automobile. The elevation of the food service tray 12 and the extended position of the stanchion 28 relative to the receiver housing 32 are fixed by a releasable latch assembly 38.

Figure 6:
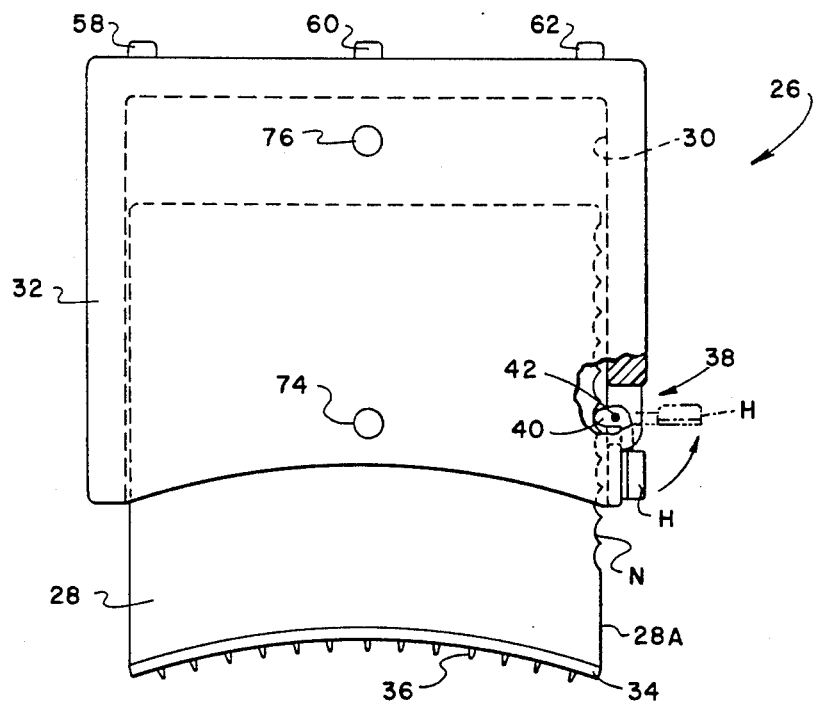
FIG. 6 is an elevational view, partially in section, of the leg stand assembly shown in FIG. 1.

The leg stand assembly 26 is adjustable to fit the wide range of vertical heights from seat to floor found in various automobiles. Referring to FIG. 6, adjustability is provided by the positive lock latch assembly 38 which is releasably engagable with the stanchion for limiting extension and retraction of the stanchion 28. In this arrangement, the stanchion 28 has a side edge portion 28A in which a plurality of detent notches N are formed. The latch assembly 38 includes a cam latch 40 which is pivotally mounted onto the receiver housing 32 for movement from a locked position in which the cam latch is inserted into a selected one of the detent notches N, with the cam latch 40 applying a force of compression against the stanchion 28, so that the stanchion 28 is compressed between the cam latch 40 and the opposite side of the receiver housing 32. The cam latch 40 is movable to an unlocked position (phantom lines) wherein the cam latch 40 is removed out of the selected detent notch, thereby permitting full extension and retraction of the stanchion 28. When the cam latch 40 is in the locked position, however, the stanchion 28 is seized between the cam latch and the receiver housing, thereby securely locking the stanchion into a fixed position.

The notches N are located on $\frac{3}{8}$ inch center intervals and provide an adjustment range of about 5 inches, thereby providing a minimum vertical leg stand height of about 5 inches, to a maximum of about 10 inches.

The cam latch assembly 38 provides positive locking engagement for securing the position of the stanchion 28 at any desired position within the adjustable range. The stanchion 28 is seized between the cam 40 and the opposite side of the receiver housing 32 when the cam latch handle H is rotated to the down and locked position as shown in FIG. 6. As the handle H is rotated downwardly, the cam latch 40 rotates into a selected notch N, with the cam latch applying a compressive force against the side of the stanchion 28. The cam latch 40 is mounted onto a pin 42 for pivotal movement between the latched and unlatched positions as shown in FIG. 6.

In FIG. 10, a modification of the receiver housing is illustrated. In this embodiment, the receiver housing 32' has a window opening 32A formed in one side panel thereof. Otherwise, the construction of the receiver housing 32' is identical to the receiver housing 32 as illustrated in FIG. 6.

Referring now to FIG. 7, an alternative leg stand assembly 44 is illustrated. In this assembly, the stanchion 28 is mounted for extension and retraction within the receiver housing pocket 30, and adjustability is provided by a plurality of index holes 46 which are formed in the stanchion, and at least one index hole 48 formed through the sidewall of the receiver housing 32. The index holes 46 are preferably $\frac{1}{4}$ inch bores spaced on $\frac{1}{2}$ inch centers. The index hole 48 in the receiver housing is alignable with the index holes in the stanchion whereby a latch peg 50 can be inserted through the aligned holes for locking the stanchion onto the receiver housing at a selected support position. Preferably, the index holes 46 are aligned along a common longitudinal axis Z which is parallel with the longitudinal axis of the stanchion 28. For increased stability, a second row of index bores 46 are formed in the stanchion 28 at spaced locations along a parallel axis Y which is laterally spaced with respect to the first row of index holes, and which is aligned in parallel with the stanchion longitudinal axis. In the embodiment shown in FIG. 7, the stanchion 28 is secured at a desired extended position relative to the receiver housing 32 by the pegs 50 which are inserted through the aligned bores.

Figure 15:
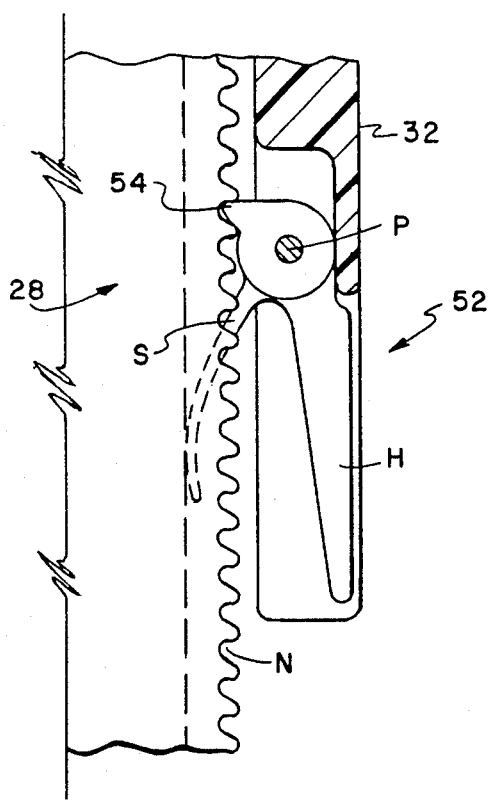

Referring now to FIG. 15, yet another positive latch arrangement is illustrated. In this embodiment, a positive latch assembly 52 includes a tang 54 which is pivotally mounted by a pin P onto the receiver housing 32. A leaf spring S is connected to the tang and is engagable against the stanchion 28 for yieldably opposing pivotal movement of the tang 54. The tang is rotatable from a locked position as shown in FIG. 15 in which the tang is inserted into a selected one of the detent notches N, to an unlocked position wherein the tang is removed out of the selected detent notch. In the locked position, the spring S applies a counterclockwise turning moment to the tang 54 which is reacted by the stanchion 28 and secures the tang 54 within the selected notch N, thereby locking the stanchion 28 at a desired position relative to the receiver housing 32.

Figure 2:
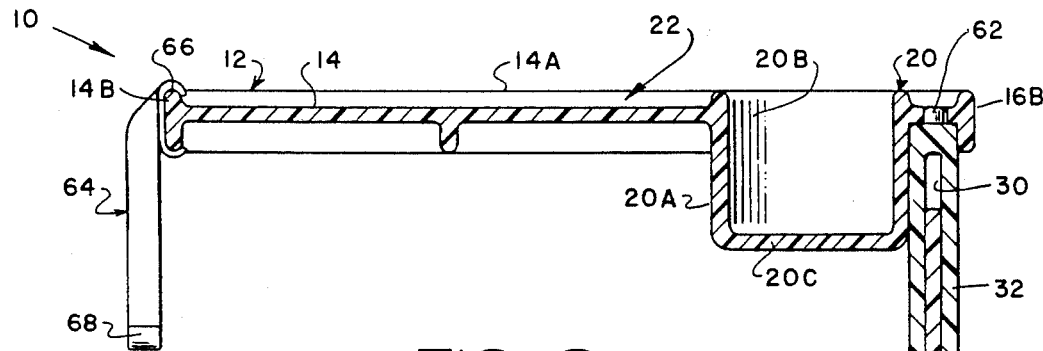
FIG. 2 is a sectional view thereof taken along the line 2—2 of FIG. 1.
Figure 3:
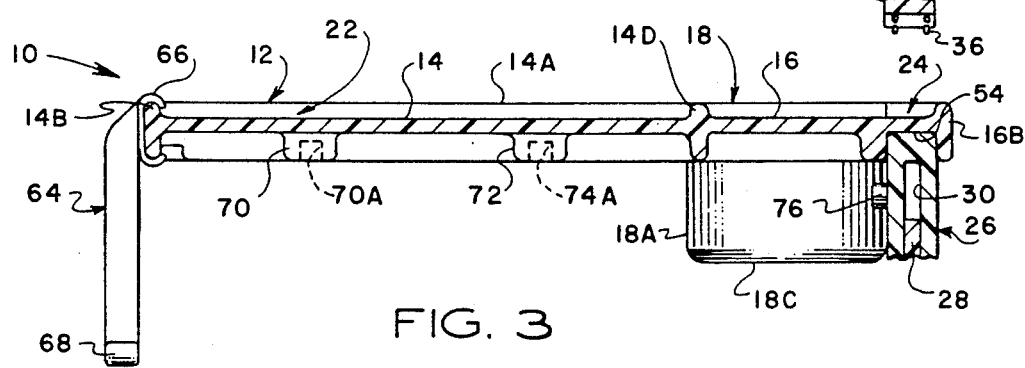
FIG. 3 is a sectional view thereof taken along the line 3—3 of FIG. 1.
Figures 4, 5:
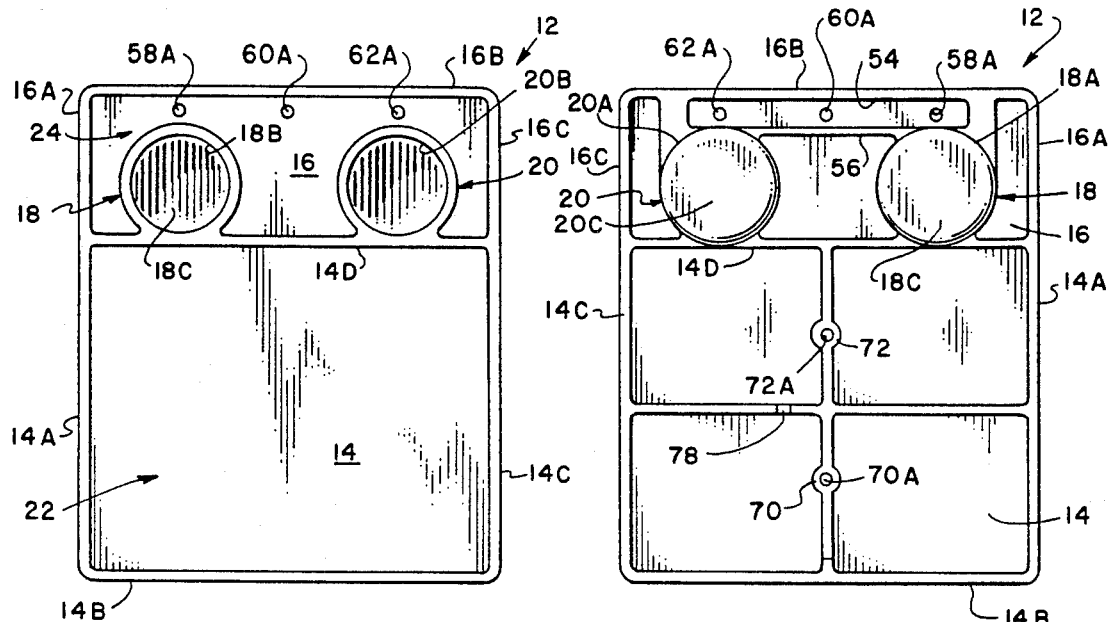
FIG. 4 is a top plan view thereof.
FIG. 5 is a bottom plan view thereof.

According to an important feature of the preferred embodiment, the leg stand assembly 26 is removably attached to the tray 12 by a friction fit male/female connection along the entire width of the receiver housing within a slotted opening in the underside of the tray. Referring to FIG. 2, FIG. 3 and FIG. 5, a rectangular slot 54 is formed in the underside of the tray and is bordered on the forward edge by the shoulder 16B, and is bordered on its opposite side by an internal shoulder 56. The stanchion 28 is dimensioned for frictional, interference fit within the slot 54. In this arrangement, the receiver is pressed into the slot 54, with the shoulders 16B and 56 yielding slightly as the receiver housing 32 is inserted. The frictional, interference union is reinforced by three pins 58, 60 and 62 which project from the top side surface of the receiver housing 32. The pins 58, 60 and 62 are receivable within blind bores 58A, 60A and 2A which intersect the forward panel 16 at symmetrically spaced locations which correspond with the spacing of the reinforcing pins 58, 60 and 62, respectively. Additionally, the press-fit interconnection between the stanchion 28 and the tray 12 is reinforced by engagement of the cylindrical sidewalls 18A, 20A (see FIG. 2 and FIG. 3). In the preferred embodiment as shown in FIGS. 1, 2 and 3, the beverage receptacles 18, 20 have cylindrical sidewalls 18A, 20A, respectively, which project downwardly from the forward panel 16, with the internal bore 18B, 20B of each receptacle providing a compartment for receiving a beverage container such as a cup, can or bottle. In this embodiment, the bottom of each receptacle is sealed by a bottom panel 18C, 20C, respectively. According to this arrangement, a cylindrical beverage container such as a bottle or aluminum will be retained securely against shifting movement.

According to the invention in one of its aspects, the food service tray 12 is stabilized against shifting movement by an anchor arm 64 which is attached to the aft shoulder 14B of the aft tray panel 14. According to this arrangement, the anchor arm is insertable between relatively movable seats of an automobile, substantially as shown in FIG. 9. Preferably, the anchor arm 64 is slidably coupled to the shoulder 14B by a resilient C-clamp 66. In this arrangement, the stanchion 28 is mounted onto the top of the transmission hump 68, with the stanchion 28 being extended sufficiently to provide a substantially level orientation of the food service tray 12 when the aft panel section 14 is placed on top of the automobile seats. The anchor arm 64 can be moved laterally along the rear shoulder 14B to accommodate off center individual seats. After the anchor arm 64 has been correctly positioned, it is inserted into the gap G between the separately movable front seats S1, S2. Preferably, the anchor arm 64 has a retainer bar 68 attached to its distal end for opposing retraction of the anchor arm 64 out of the gap G. The restraining action is provided by frictional engagement between the retainer bar 68 and the facing side surfaces of the separately movable seats S1, S2.

It will be appreciated that on automobiles which have a bench seat either in the front or the rear, that the anchor arm 64 is not used. In such instances, the anchor arm is removed from the food service tray 12. Accordingly, the portable utility console 10 can be used in combination with independently movable bucket seats as well as bench seats. When the anchor arm 64 is utilized, the utility tray 12 is stabilized against the car seat without the use of tie-down straps. Moreover, the food service tray 12 is stabilized against shifting movement under normal driving conditions, and does not require operator or passenger attention to maintain a fixed service position.

According to an important feature of the invention in one of its aspects, the portable utility console 10 can be set up quickly for automobile use and can be easily disassembled for compact storage when not in use. Quick setup and disassembly are provided by the press-fit frictional engagement between the receiver housing 32 and the slot receptacle 54 as previously discussed. The leg stand assembly 26 is separated from the food service tray 12 merely by pulling on the receiver housing 32 with a force sufficient to overcome the frictional, interference fit. After the leg stand assembly 26 has been removed, it is attached onto the underside of the food service tray 12 as illustrated in FIG. 8.

In the foregoing arrangement, press-fit female coupling receptacles are formed at centrally spaced locations along the underside of the food service tray 12. The receiver housing 32 has a pair of coupling pegs 74, 76 which project at right angles to the inner sidewall of the receiver housing and are spaced by a corresponding spacing distance for registration with the coupling receptacles 70, 72, respectively. Each coupling receptacle has a bore 70A, 72A, respectively, which is sized appropriately for an interference, frictional fit with the coupling pegs 74, 76, respectively. As shown in FIG. 8, the leg stand assembly 26 is assembled in a minimum height configuration to facilitate storage and handling. Moreover, the anchor arm 64 is inserted into a retainer notch 78 (see FIG. 5) and is confined between the leg stand assembly 26 and the food service tray 12.

Figure 11:
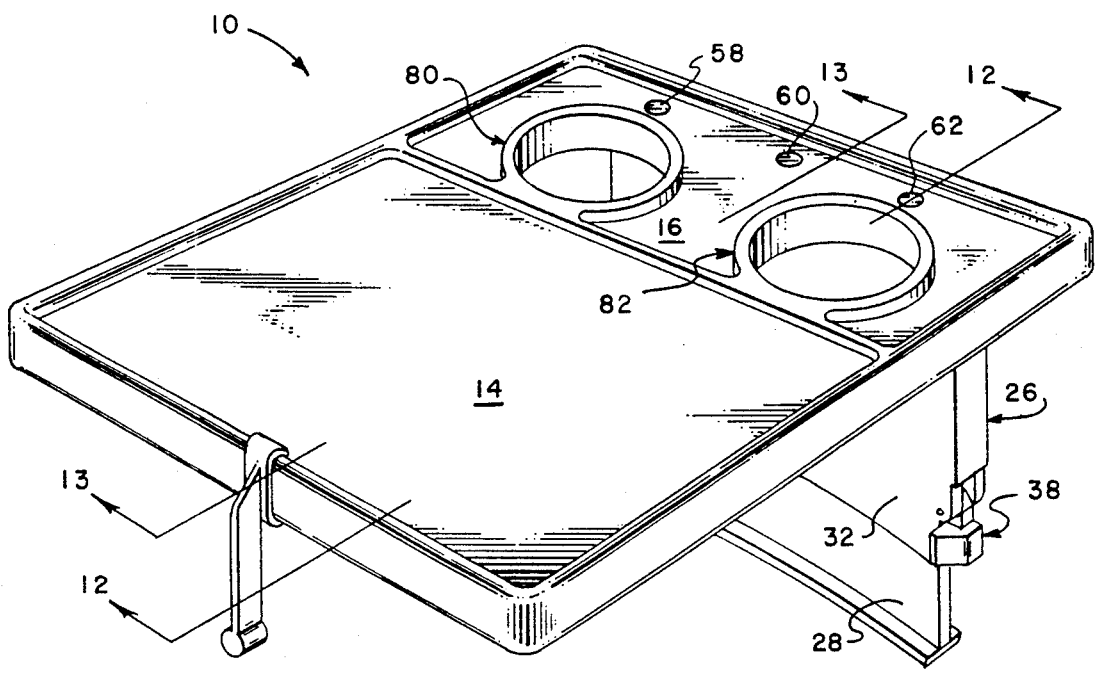
FIG. 11 is a perspective view of a food service tray constructed according to a first alternative embodiment of the present invention.
Figure 12:
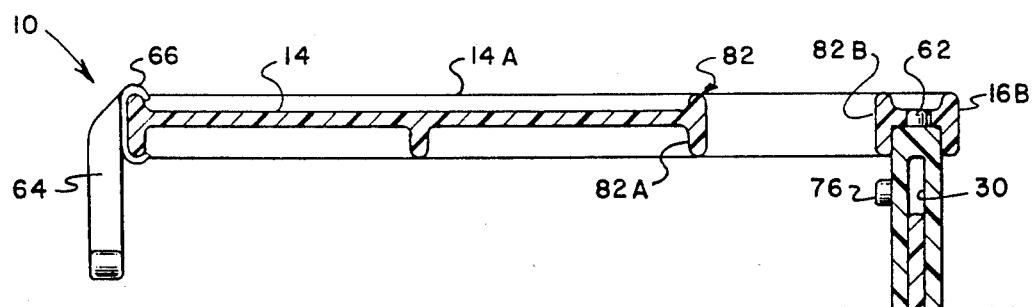
FIG. 12 is a sectional view thereof taken along the line 12—12 of FIG. 11.
Figure 13:
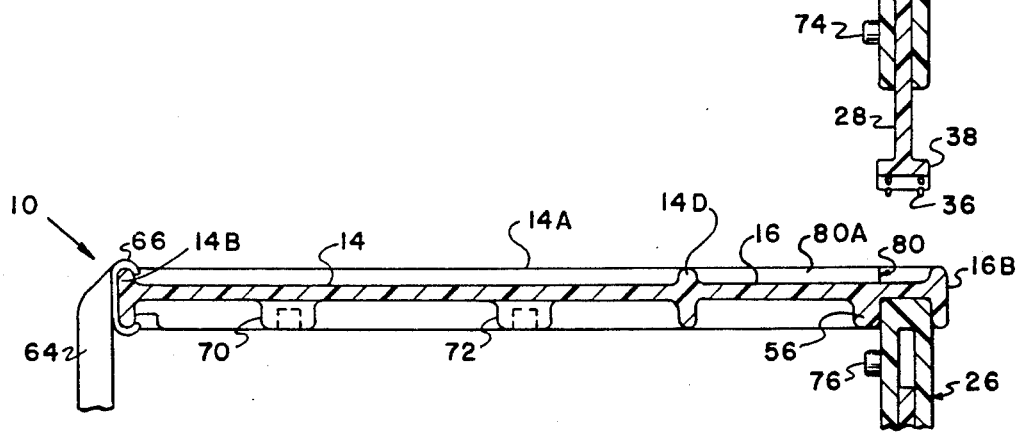
FIG. 13 is a sectional view thereof taken along the line 13—13 of FIG. 11.

In an alternative embodiment shown in FIGS. 11, 12 and 13, the beverage receptacles are formed by open-ended, cylindrical collars 80, 82. This beverage receptacle arrangement will accommodate tapered drinking cups of the kind commonly used in fast-foot restaurants, and will also accommodate coffee mugs which have a reduced diameter bottom portion. The cylindrical collars 80, 82 have sidewall portions 80A, 82A which provide lateral support and frictional engagement with the receiver housing of the le said stand assembly 26. Except for the construction of the cylindrical collar receptacles 80, 82, the remaining portions of the utility console assembly 10 are identical to that described with reference to FIG. 1.

Figure 14:
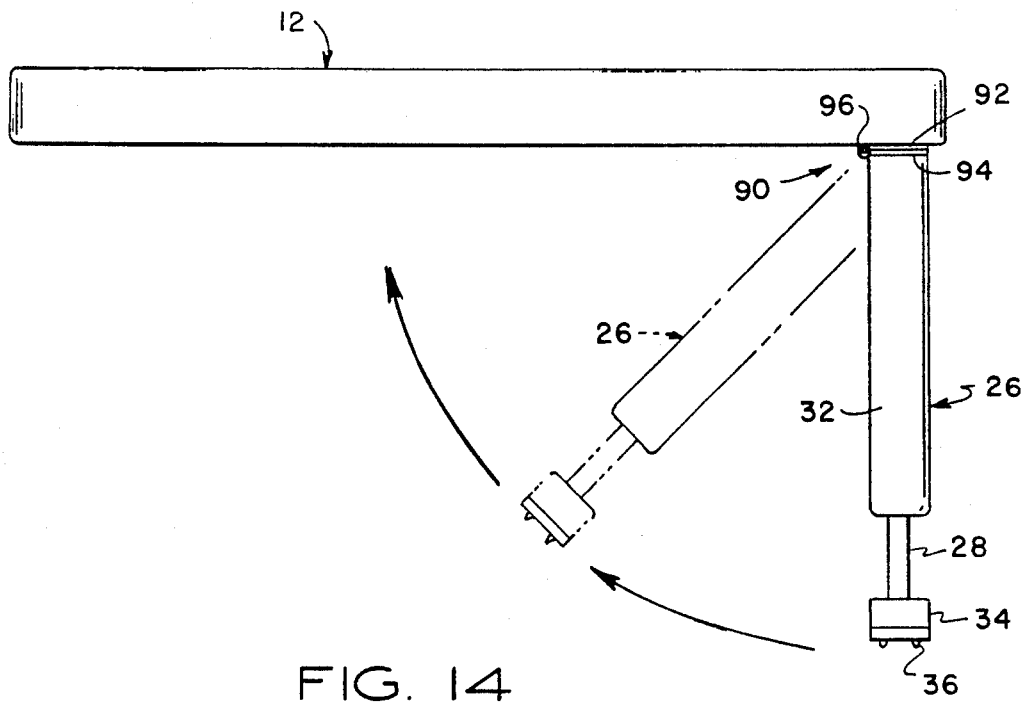
FIG. 14 is a simplified side elevational view, partially broken away, of an alternative embodiment in which the leg stand assembly is pivotally mounted onto the food service tray; and, FIG. 15 is an elevational view, partly in section, which illustrates an alternative leg stand latch assembly.

In yet another alternative embodiment as shown in FIG. 14, the leg stand assembly 26 is pivotally connected to the tray 12 by a hinge 90 which permits movement of the leg stand assembly from its supporting position in which the leg stand assembly projects at a right angle with respect to the tray 12, to a fully retracted position adjacent the underside of the tray 12 for compact storage. The hinge 90 includes an upper hinge leaf 92 which is rigidly attached to the underside of the tray 12, and a lower hinge leaf 94 which is rigidly attached to the top of the receiver housing 32. In this embodiment, the stabilizing pins 58, 60 and 62 ar not utilized.

The foregoing exemplary embodiments of the utility console 10 are preferably constructed of an injection molded plastic material, for example acrylonitrile butadiene styrene (ABS) thermoplastic resin, or an expandable thermoplastic resin such as polystyrene, urethane, polyethylene or polyvinyl chloride (PVC). If the assembly is constructed by an expanded ("foamed") plastic, the preferred wall thickness is about ¼ inch. When ABS injection molded plastic is utilized, slightly thinner walls and panels are provided, in the range of 1.5 mm – 2.0 mm. In that instance, it may be desirable to include longitudinal spacer ribs along the stanchion 28. It will be appreciated that the use of molded plastic material is not essential, and that the utility console of the invention can be constructed of other materials such as aluminum and wood.

Although the invention has been described with reference to preferred and alternative embodiments, and with reference to preferred materials, the foregoing description is not intended to be construed in a limiting sense. Various modifications of the disclosed embodiments as well as alternative applications of the invention will be suggested to persons skilled in the art by the foregoing specification and illustrations. It is therefore contemplated that the appended claims will cover any such modifications, applications or embodiments as fall within the true scope of the invention.

What is claimed is:

1. A portable utility console for use in an automobile comprising, in combination:
    a tray having a bottom side surface adapted for engagement against an automobile seat and having a top side surface adapted for supporting one or more items;
    a leg stand attached to said tray, said leg stand including a receiver housing, a passage formed in said receiver housing, and including a stanchion slidably disposed within said receiver passage for extension and retraction relative to said tray;
    a latch assembly mounted on said leg stand and releasably engagable with said stanchion for limiting extension and retraction of said stanchion; and,
    said tray having a side shoulder formed along a forward marginal edge portion of said top side surface and said tray having a receptacle for receiving a beverage container, said receptacle being formed by a tubular sidewall which is laterally spaced with respect to said side shoulder, thereby defining a channel, said receiver housing being insertable into said channel and securable therein by frictional engagement against said side shoulder and tubular sidewall.

2. A portable utility console for use in an automobile comprising, in combination:
    a tray having a bottom side surface adapted for engagement against an automobile seat and having a top side surface adapted for supporting one or more items;
    a leg stand assembly attached to said tray, said leg stand assembly including a receiver housing having a plurality of sidewall panels defining a channel, and including a stanchion slidably disposed within said receiver channel for extension and retraction relative to said tray;
    a latch assembly mounted on said leg stand and releasably engagable with said stanchion for limiting extension and retraction of said stanchion; and,
    a first press fit coupling member mounted on said receiver housing and a complementary press fit coupling member mounted on the bottom side of said tray for receiving said first press fit coupling member, said tray being mountable onto said receiver housing by frictional engagement of the first press fit coupling member against the complementary press fit coupling member.

3. A portable utility console for use in an automobile comprising, in combination:
    a tray having a bottom side surface adapted for engagement against an automobile seat and having a top side surface adapted for supping one or more items;
    a leg stand attached to said tray, said leg stand including a receiver housing, said receiver housing having a plurality of sidewall panels defining a channel, and including a stanchion slidably disposed within said receiver channel for extension and retraction relative to said tray;
    a latch assembly mounted on said leg stand nd releasably engagable with said stanchion for limiting extension and retraction of said stanchion; and,
    at least one press-fit coupling member formed on the bottom side of said tray, and said leg stand having at least one complementary press fit coupling member formed on said receiver housing, whereby said leg stand can be removed from its supporting position onto said tray and placed in engagement against the bottom surface of said tray for compact storage, with said at least one press fit coupling member on said receiver housing being mountable in press-fit frictional engagement against the complementary press fit coupling member formed on the bottom surface of said tray.

4. A portable utility console for use in an automobile comprising, in combination:
    a tray having an aft panel section adapted for engagement against an automobile seat, a top side surface adapted for supporting one or more items, and a forward panel section, said forward panel section having a width dimension;
    a leg stand attached to the forward panel section of said tray, said leg stand having a thickness dimension and a width dimension, the width dimension of said leg stand being substantially greater than its thickness dimension;
    a stanchion slidably coupled to said leg stand for extension and retraction relative to said tray, said stanchion having a thickness dimension and a width dimension, the width dimension of said stanchion being substantially greater than its thickness dimension;

a latch assembly mounted on said leg stand assembly, said latch assembly having a latch member releasably engagable with said stanchion for limiting extension and retraction of said stanchion; and, at least one press-fit coupling member formed on one side of said tray, and said leg stand having at least one complementary press-fit coupling member formed thereon, whereby said leg stand can be disengaged from the forward panel section of said tray and mounted against said one side of said tray for compact storage, with the complementary coupling member formed on the leg stand being mountable in press-fit frictional engagement with the coupling member formed on said tray.

* * * * *